United States Patent
Rong

(10) Patent No.: US 12,242,552 B2
(45) Date of Patent: Mar. 4, 2025

(54) FEATURE EXTRACTION SYSTEM AND METHOD FOR ENHANCING RECOMMENDATIONS

(71) Applicant: Rakuten Symphony, Inc., Tokyo (JP)

(72) Inventor: Xiaohui Rong, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/800,253

(22) PCT Filed: Jun. 3, 2022

(86) PCT No.: PCT/US2022/032078
§ 371 (c)(1),
(2) Date: Aug. 17, 2022

(87) PCT Pub. No.: WO2023/234947
PCT Pub. Date: Dec. 7, 2023

(65) Prior Publication Data
US 2024/0296191 A1 Sep. 5, 2024

(51) Int. Cl.
*G06F 16/9535* (2019.01)
*G06F 11/34* (2006.01)

(52) U.S. Cl.
CPC .................. *G06F 16/9535* (2019.01)

(58) Field of Classification Search
None
See application file for complete search history.

(56) References Cited

U.S. PATENT DOCUMENTS

2008/0120339 A1   5/2008  Guan et al.
2018/0357322 A1*  12/2018 Sharma ............... G06F 16/9535
2019/0347708 A1*  11/2019 Min ..................... G06Q 30/0631

OTHER PUBLICATIONS

Augusto Q. Macedo; Context-Aware Event Recommendation in Event-based Social Networks ;ACM; 2015; pp. 123-130.*
International Search Report dated Sep. 2, 2022 in International Application No. PCT/US22/32078.
Written Opinion of the International Searching Authority dated Sep. 2, 2022 in International Application No. PCT/US22/32078.

* cited by examiner

*Primary Examiner* — Albert M Phillips, III
*Assistant Examiner* — Jermaine A Mincey
(74) *Attorney, Agent, or Firm* — Sughrue Mion, PLLC

(57) ABSTRACT

A method, performed by at least one processor of a computing device, for recommending an event, the method including determining a frequency of execution of the event by a user among a plurality of users; determining an inverse user frequency of execution of the event based on the plurality of users who have executed the event; generating a recommendation factor by modifying the frequency of execution of the event by the user based on the inverse user frequency of execution of the event; and outputting a recommendation for the event based on the recommendation factor.

9 Claims, 8 Drawing Sheets

500

| | $X_1$ | $X_2$ | ... | $X_m$ |
|---|---|---|---|---|
| $U_1$ | 0 | 2 | | 5 |
| $U_2$ | 1 | 0 | | 0 |
|  | | | | |
| $U_n$ | 3 | 7 | | 0 |

510

|  | $X_1$ | $X_2$ | ... | $X_m$ |
|---|---|---|---|---|
| $U_1$ | 0 | 1 |  | 1 |
| $U_2$ | 1 | 0 |  | 0 |
| . |  |  |  |  |
| . |  |  |  |  |
| . |  |  |  |  |
| $U_n$ | 1 | 1 |  | 0 |

FEATURE EXTRACTION SYSTEM AND METHOD FOR ENHANCING
RECOMMENDATIONS

FIELD

Apparatuses and methods consistent with example embodiments of the present disclosure relate to systems and methods for providing automated recommendations.

DESCRIPTION OF RELATED ART

In the field of recommendation provisioning, conventional recommendation systems provide to a user a recommendation of an event (e.g., a product, a service, a template, etc.) by collaborative filtering (e.g., determine the most frequently accepted recommendation/most frequently executed event and filter other recommendations/events). These conventional recommendation systems, however, have some shortcomings as a common challenge in the field of recommendation provisioning is how to determine what a user really is interested in and how to reflect that interest in a numerical form.

Conventional recommendation systems determine a recommendation for a user by collaborative filtering. Specifically, the conventional system will determine the relationship between a user and an event (e.g., a recommendation provided to the user), by determining how many times the user has executed the event (e.g., how many times the user has accepted the recommendation, etc.)

However, such an approach may not necessarily provide an accurate recommendation to a user. For example, a user may execute an event just because it is a commonly executed event, but not because the user really is interested in the event. For example, a user might view movie A via accepting a recommendation of movie A just because movie A is a big hit at that time, but it does not necessarily mean that the user is interested in movie A.

Insufficient feature extraction makes it more difficult for a recommendation system to discriminate which data actually reflects a user's interest. This can result in provisioning an inaccurate recommendation, lack of customization of the provided recommendation, and fostering bad experiences by users. Accordingly, there is a need for systems, methods, and techniques for enhanced recommendation provisioning that more accurately reflects a user's interest.

SUMMARY

According to embodiments, systems and methods described here, a recommendation can be determined by extracting a feature of a user's interest. Specifically, systems and methods according to certain embodiments described here, compute a recommendation factor based on a novel algorithm, which involves both the user's execution/acceptance frequency and a common level of the recommendation/event. This algorithm and its associated parameters, in particular, can improve the accuracy of recommendations for a user over recommendations made by conventional recommendation systems and techniques.

According to an embodiment, a method, performed by at least one processor of a computing device, for recommending an event, includes determining a frequency of execution of the event by a user among a plurality of users; determining an inverse user frequency of execution of the event based on the plurality of users who have executed the event; generating a recommendation factor by modifying the frequency of execution of the event by the user based on the inverse user frequency of execution of the event; and outputting a recommendation for the event based on the recommendation factor.

The frequency of execution of the event by the user may be determined based on how often the user executes the event.

The inverse user frequency of execution of the event may be determined based on how many of the plurality of users execute the event.

The recommendation factor may be modified according to:

$$\text{Recommendation Factor}_{ij} = \frac{t_{ij}}{\sum_{k=1}^{m} t_{ik}} \times \log_a \frac{|U|}{|\{u \in U : x_j \in u\}|}, \text{ where } \frac{t_{ij}}{\sum_{k=1}^{m} t_{ik}}$$

represents an execution frequency$_{ij}$ and $$\log_a \frac{|U|}{|\{u \in U : x_j \in u\}|}$$

represents an inverse user frequency$_j$, where i is an integer from 1 to n and n=a number of users U, where j is an integer from 1 to m and m=a number of events X, and where $\log_a$ is a logarithm base a where a is a real number.

The method may further include inputting the recommendation factor into a feature vector for input to a recommendation algorithm that determines a possibility of the user executing the event.

The recommendation algorithm may be any suitable mathematical/machine learning algorithm that determines the possibility of the user executing the event.

According to another embodiment, an apparatus for generating a recommendation, includes a data storage configured to store an event execution record that includes information concerning a plurality of events executed by a plurality of users; at least one computer readable memory having recorded therein program instructions; and at least one processor configured to execute the program instructions. When the program instructions are executed, a method is performed that includes determining a frequency of execution of an event, among the plurality of events in the event execution record, by a user among a plurality of users; determining an inverse user frequency of execution of the event based on the plurality of users who have executed the event; generating a recommendation factor by modifying the frequency of execution of the event by the user based on the inverse user frequency of execution of the event; and outputting a recommendation for the event based on the recommendation factor.

With the apparatus, the frequency of execution of the event by the user may be determined based on how often the user executes the event.

With the apparatus, the inverse user frequency of execution of the event may be determined based on how many of the plurality of users execute the event.

With the apparatus the recommendation factor may be modified according to:

$$\text{Recommendation Factor}_{ij} = \frac{t_{ij}}{\sum_{k=1}^{m} t_{ik}} \times \log_a \frac{|U|}{|\{u \in U : x_j \in u\}|}, \text{ where } \frac{t_{ij}}{\sum_{k=1}^{m} t_{ik}}$$

represents an execution frequency$_{ij}$ and $$\log_a \frac{|U|}{|\{u \in U : x_j \in u\}|}$$

represents an inverse user frequency$_j$, where i is an integer from 1 to n and n=a number of users U, where j is an integer from 1 to m and m=a number of events X, and where $\log_a$ is a logarithm base a where a is a real number.

With the apparatus, the recommendation factor may be input into a feature vector for input to a recommendation algorithm that determines a possibility of the user executing the event.

With the apparatus, the recommendation algorithm may be any suitable mathematical/machine learning that determines the possibility of the user executing the event.

According to yet another embodiment, a non-transitory computer-readable medium having stored therein program instructions, that when executed by one or more processors, performs a method including determining a frequency of execution of the event by a user among a plurality of users; determining an inverse user frequency of execution of the event based on the plurality of users who have executed the event; generating a recommendation factor by modifying the frequency of execution of the event by the user based on the inverse user frequency of execution of the event; and outputting a recommendation for the event based on the recommendation factor.

With the non-transitory computer-readable medium, the frequency of execution of the event by the user may be determined based on how often the user executes the event.

With the non-transitory computer-readable medium, the inverse user frequency of execution of the event may be determined based on how many of the plurality of users execute the event.

With the non-transitory computer-readable medium, the recommendation factor may be modified according to:

$$\text{Recommendation Factor}_{ij} = \frac{t_{ij}}{\sum_{k=1}^{m} t_{ik}} \times \log_a \frac{|U|}{|\{u \in U : x_j \in u\}|}, \text{ where } \frac{t_{ij}}{\sum_{k=1}^{m} t_{ik}}$$

represents an execution frequency$_{ij}$ and $$\log_a \frac{|U|}{|\{u \in U : x_j \in u\}|}$$

represents an inverse user frequency$_j$, where i is an integer from 1 to n and n=a number of users U, where j is an integer from 1 to m and m=a number of events X, and where $\log_a$ is a logarithm base a where a is a real number.

With the non-transitory computer-readable medium, the method may further include inputting the recommendation factor into a feature vector for input to a recommendation algorithm that determines a possibility of the user executing the event.

With the non-transitory computer-readable medium, the recommendation algorithm may be any suitable mathematical/machine learning that determines the possibility of the user executing the event.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
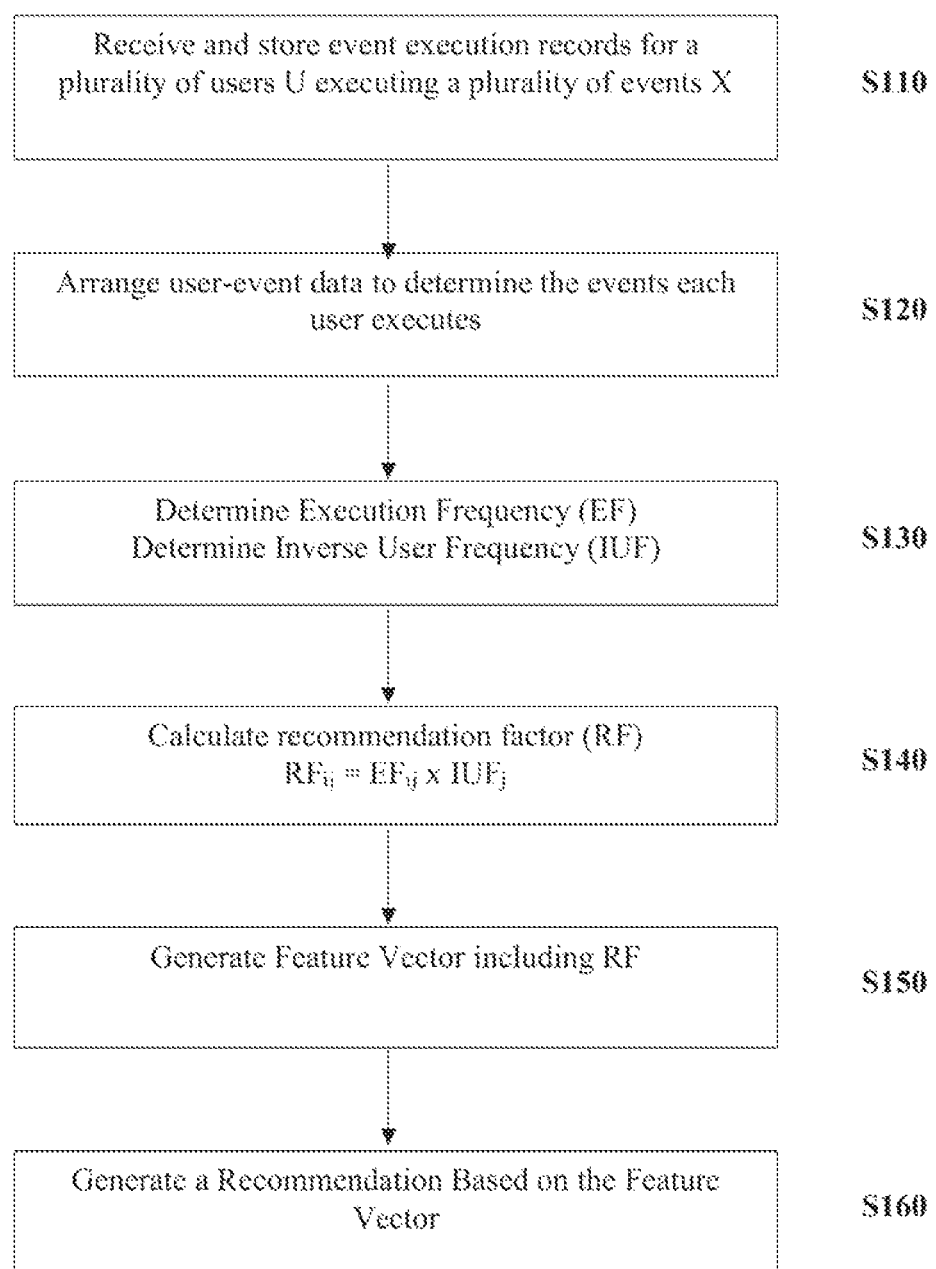
FIG. 1 is a flowchart illustrating a method of generating a recommendation of an event using a recommendation factor according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide methods and systems to generate and/or use a recommendation factor to adjust a recommendation approach (e.g., a conventional collaborative filtering, etc.). The recommendation factor takes into consideration how common the execution of an event is and adjusts, or fine tunes, a recommendation algorithm based on how often users execute the event. This adjustment fine tunes the recommendation by reducing the influence a larger population of users might have on any particular user executing an event, thereby increasing the accuracy of recommendations. These embodiments can, although need not, solve the problems with conventional recommendation systems of provisioning inaccurate recommendations due to the influence of commonly recommended events by many users.

More specifically, certain embodiments include systems and methods that compute a recommendation factor, described in more detail below, based on a parameter indicating the user's execution frequency of an event (e.g., how many times a target user executes the event) and a parameter indicating a commonality of the event among users, such as a measure of how commonly an event is executed (e.g., how many users executed that event).

The recommendation factor can be computed based on a user's execution frequency of an event and an inverse user frequency of the event.

Execution frequency can be computed according to equation (1):

$$\text{Execution Frequency}_{ij} = \frac{\text{Total times a User}_i \text{ has executed } X_j}{\text{Total times a User}_i \text{ has executed all } X} = \frac{t_{ij}}{\sum_{k=1}^{m} t_{ik}}, \quad (1)$$

where $t_{ij}$ represents the total times a User$_i$ executes a specific event $X_j$, where $\sum_{k=1}^{m} t_{ik}$ represents the total times User$_i$ has executed all events X and wherein the total times User$_i$ has executed all events X is greater than zero, where i is an integer from 1 to n and n=number of users U, and where j is an integer from 1 to m and m=number of events X.

Execution Frequency$_{ij}$ (EF$_{ij}$) reflects how frequently an event $X_j$ (e.g., acceptance of a recommendation, performing an action, etc.) in a plurality of events X is executed by User$_i$. In some cases, the total times the User$_i$ has executed event $X_j$ is higher than other users, simply because of User$_i$ executes all of the plurality of events X more frequently as compared to other users. Thus, the total times the User$_i$ has executed event $X_j$, alone, does not accurately reflect the interest of User$_i$. In view of the above, a normalization process is required in order to more accurately reflect how frequently the event $X_j$ is executed due to User$_i$'s interest. Specifically, the normalization is done by dividing the total times the User$_i$ has executed event $X_j$ with the total times User$_i$ has executed all of the plurality of events X. In some embodiments, the normalization is done by dividing the total times the User$_i$ has executed event $X_j$ with the total times User$_i$ has executed a subset of events of the plurality of events X.

Inverse user frequency$_j$ (IUF$_j$) reflects how common/distinguishable the execution of $X_j$ is among all of the users and can be computed according to equation (2):

$$\text{Inverse user frequency}_j = \log_a \frac{\text{Total amount of users}}{\text{Number of users who have executed } X_j} = \log_a \frac{|U|}{|\{u \in U : x_j \in u\}|} \quad (2)$$

where |U| represents the total number of users U, |{u∈U: $x_j$∈u}| represents the number of users who have executed event $X_j$ and wherein the number of users who have executed event $X_j$ is greater than zero, j is an integer from 1 to m and m=number of events X, and a can be an integer or any suitable constant like Euler's number e.

The Recommendation Factor$_{ij}$ (RF$_{ij}$) reflects a degree of interest the event $X_j$ is to User$_i$, and can be computed according to equation (3):

$$\text{Recommendation Factor}_{ij} = \quad (3)$$
$$EF_{ij} \times IUF_j = \frac{t_{ij}}{\sum_{k=1}^{m} t_{ik}} \times \log_a \frac{|U|}{|\{u \in U : x_j \in u\}|}$$
$$\text{where } \frac{t_{ij}}{\sum_{k=1}^{m} t_{ik}}$$

represents Execution Frequency$_{ij}$ and $$\log_a \frac{|U|}{|\{u \in U : x_j \in u\}|}$$

represents Inverse User Frequency$_j$, and where i is an integer from 1 to n and n=number of users U, where j is an integer from 1 to m and m=number of events X, and where a can be an integer or any suitable constant like Euler's number e.

As will be discussed below, by using the recommendation factor, a recommendation can be generated that is of more interest to a user than a recommendation generated by conventional techniques. The recommendation factor can generate a better representation of the data because it is cross-calculated for each user ("i") among a plurality of users and each event ("j") among a plurality of events, where i=1 to n and n=number of users U, and where j=1 to m and m=number of events X. This, in turn, increases the recommendation accuracy and thereby increases the acceptance rate of the generated recommendation.

FIG. 1 is a flowchart illustrating an example embodiment of a method of generating a recommendation based on a recommendation factor. In this embodiment, a plurality of users U execute a plurality of events X. The events can be anything that can be recommended, such as a product, a service, an action, a workflow, a script, etc.

In step S110 a computer controlled recommendation system receives and stores event execution records for a plurality of users U who execute a plurality of events X. These event execution records are received from any suitable resource (e.g., a user terminal, an event execution terminal, etc.) and can be stored in a wide variety of storage arrangements and devices. In some embodiments, such as shown in step S120, the data that have been received and stored are arranged in a manner to facilitate determining the events each user executes. This operation shown in step S120, is an optional operation that may not be performed if the received data is in an arrangement suitable for processing. An example of arranging data in S120 is arranging the data in a matrix format in which events executed by a user, among the plurality of users U, are recorded in the matrix. In the same embodiment, or an alternative embodiment, the user-event relations are stored in a relational database in which the database relates each user to each event executed by that user. Other techniques for arranging the user-event data also can be used.

In step S130, the event execution records, or a dataset generated therefrom, are used to determine an execution frequency (EF) of an event by a user and an inverse user frequency (IUF) for the event. The EF and IUF may be determined at the same time or one before the other. The execution frequency is a relation of the number of times a user executes a particular event to the number of times the user executes all the events X. For example, the execution frequency can be determined according to Equation 1.

The inverse user frequency (IUF) provides an inverse indication of how often the population of users U execute a particular event x. The inverse user frequency according to the present embodiment can be determined according to Equation 2.

In step S140, a recommendation factor (RF) is calculated. In this embodiment a recommendation factor is calculated for each user-event pair. In other embodiments a recommendation factor for a portion of the user-event pairs is calculated, such as a single user-event pair. In this embodiment the recommendation factor (RF) is calculated according to Equation 3.

In step S150 a recommendation feature vector is generated, which includes the recommendation factor calculated in step S140, and is sent to a processor for generating a recommendation.

In step S160, the processor generates a recommendation for the user using the recommendation feature vector. The recommendation can then be output informing the associated user.

Figure 2:
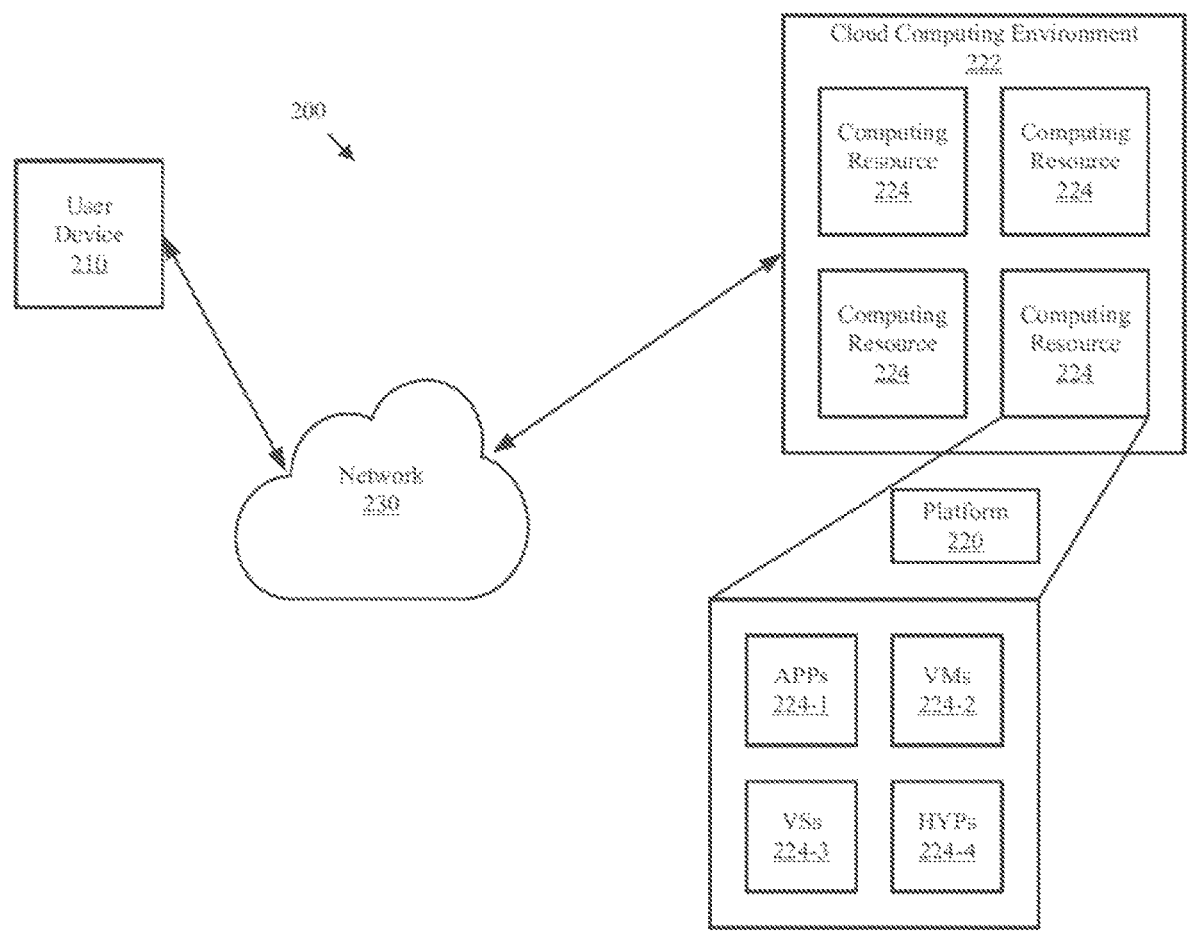
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections. In embodiments, any of the functions and operations described with reference to FIG. 1 above may be performed by any combination of elements illustrated in FIG. 2.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of receiving, generating, storing, processing, and/or providing information. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 may not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, a cluster of computing devices, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
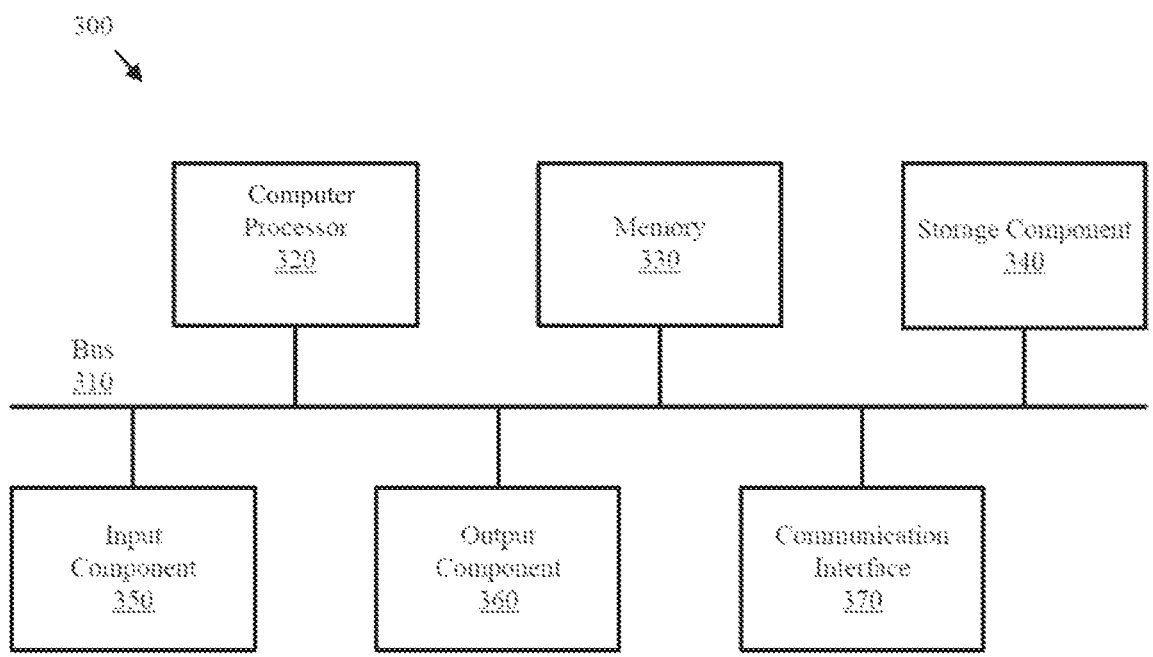
FIG. 3 is a diagram of example components of a device according to an embodiment.

FIG. 3 is a diagram of example components of a device 300. Device 300 may correspond to user device 210 and/or platform 220. As shown in FIG. 3, device 300 may include a bus 310, a computer processor 320, a memory 330, a storage component 340, an input component 350, an output component 360, and a communication interface 370.

Bus 310 includes a component that permits communication among the components of device 300. Computer processor 320 may be implemented in hardware, firmware, or a combination of hardware and software. Computer processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, computer processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by computer processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to computer processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause computer processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the operations or processes of FIG. 1, as well as embodiments shown in other figures, may be implemented by or using any one of the elements illustrated in FIGS. 2 and 3.

Figure 4:
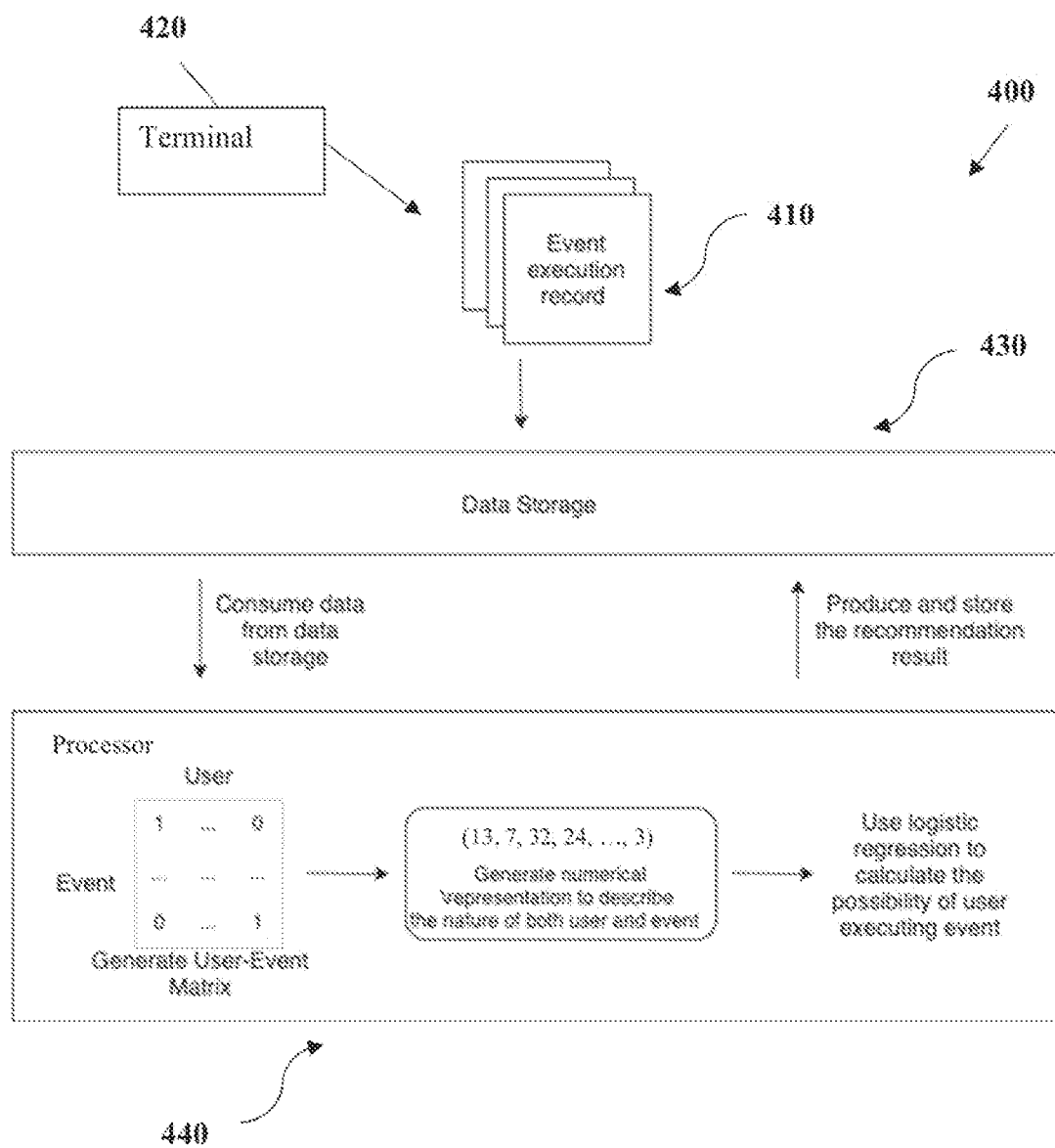
FIG. 4 is a process flow diagram illustrating a process flow for generating a recommendation of an event using a recommendation factor according to an embodiment.

An embodiment of a recommendation system that can be used to implement the methods illustrated in the various figures herein, is shown in FIG. 4. A recommendation system 400, shown in FIG. 4, includes one or more event execution records 410, which are datasets that include the execution records of multiple users and the events they executed. These records are generated from terminals 420 (e.g., user's terminal, event execution terminal, etc.) and include user-event information identifying the event that was executed and information identifying the user who executed the event. These records can include additional information about the event and the user. The users' terminals 420 can be implemented, for example, by the user device 210 shown in FIG. 2 and device 300 shown in FIG. 3.

The recommendation system 400 also includes a data storage 430, which stores computer readable user-event information input from the event execution records 410. The data storage 430 can store information of the event execution record (e.g., the datasets from the event execution records, logs of provided recommendations, etc.). The data storage 430 can be implemented with a wide variety of storage devices and services, such as magnetic media, solid state storage devices, cloud-based storage services, etc. The data storage 430 can be implemented, for example, within the user device 210, the cloud computing environment 222, or elsewhere in the network 210, shown in FIG. 2, and can be implemented in the storage component 340 of device 300 shown in FIG. 3.

A processor 440 consumes data (e.g., information of the event execution record) from the data storage device 430. The data from the data storage device can be transferred in variety of ways, including by way of a direct connection over a computer bus, over a local network, over a wide area network, or according to other techniques for transferring data. The processor can include one or more computer processors and computer readable memory for storing data and/or program instructions. The computer processor executes the program instructions to determine an execution frequency (EF), and inverse user frequency (IUF), a recommendation factor, and the like. For example, the processor can process the data from the data storage device so as to generate a user-event matrix, as illustrated in FIG. 4.

Specifically, the processor 440 processes the event execution record to determine (based on the data from the data storage device, and/or based on the user-event matrix) the execution frequency (EF) of an event executed by a user and to determine the inverse user frequency (IUF) of an event, as shown in step S130 of FIG. 1. Based on the calculated EF and IUF, the processor 440 generates a recommendation factor (RF) for the user and the event, as shown in step S140 of FIG. 1. In some embodiments, the processor 440 generates a user-event matrix to arrange the user-event data, as shown in FIG. 4.

The processor 440 performs an information extraction process on the data from the data storage 430 and/or the user-event matrix, so as to extract information associated to the recommendation process (e.g., user's information such as gender, age, and background, event information such as type of event, and the like). Subsequently, the processor 440 will combine the extracted information with the generate RF so as to generate a recommendation feature vector. The recommendation feature vector is a numerical representation that describes the nature of both the user and the event. For instance, FIG. 6 exemplifies a recommendation feature vector 600, which can also be represented in a vector of [13, 7, 32, 24, 0.30, . . . , 3]. In this example, "13" may represent a background category, "7" may represent a location category, "32" may represent an age of user, "24" may represent an event category, "0.30" may represent the RF, an "3" may represent the event execution time in hours. Subsequently, the processor 440 will calculate, based on the recommendation feature vector, a possibility of user executing the event. For instance, the processor 440 processes the recommendation feature vector with one or more suitable mathematical/machine learning algorithm (e.g., a logistic regression algorithm, a support vector machine (SVM) algorithm, an Extreme Gradient Boosting (XGBoost) algorithm, etc.) so as to calculate the possibility of the user executing the event. The processor then produces a recommendation result, based on the calculated possibility of the user executing the event. For instance, the processor will determine that an event with the highest execution possibility as the most recommended event, and will then include such event and the associate information (e.g., execution possibility, RF, etc.) in the recommendation result. In another example, the processor will determine multiple events with the top execution possibilities (e.g., top 5 highest execution possibilities, etc.), and produce the recommendation result in a similar manner. Subsequently, the processor outputs the recommendation result. The recommendation result can be output to the data storage 430 to store the recommendation which can be accessed to present the recommendation to the user.

Figure 5A:
FIG. 5A illustrates a user-event matrix according on an embodiment.

An example embodiment of a user-event matrix 500 is shown in FIG. 5A. The user-event matrix can include a row for each of the n users U, such as $U_1$, $U_2$ to $U_n$, and a row for each of the m events X, such as events $X_1$, $X_2$ to $X_m$. For each user, the number of times each event was executed by the user is stored in the matrix for that user-event combination. For example, as shown in FIG. 5A, user $U_1$ executed event $X_1$ zero (0) times, event $X_2$ two (2) times, and event $X_m$ five (5) times. User $U_2$ executed event $X_1$ one (1) time, event $X_2$ zero (0) times, and event $X_m$ zero (0) times. User $U_n$ executed event $X_1$ three (3) times, event $X_2$ seven (7) times, and event $X_m$ zero (0) times. These values are stored in the matrix as shown in FIG. 5A.

Figure 5B:
FIG. 5B illustrates a user-event matrix according on another embodiment.

An alternative embodiment of the user-event matrix is shown in FIG. 5B. In this figure the user-event matrix 510, instead of storing for each user-event pair a value indicating the number of times the user executed the event, the user-event matrix 510 stores an binary indicator of whether or not the user executed the event, regardless of how many times the user executed the event. Information indicating the number of times the user executed the event can be stored in another storage structure. In this way, the user-event matrix 510 can be used to indicate whether a user executed a specific event, and if so, the processor can determine the number of times the user executed the event by consulting the other storage structure holding a value of the number of times the user executed the event.

In the user-event matrix 510, for each user, an indicator of whether an event was executed by the user is stored in the matrix for that user-event combination. For example, a value of "1" recorded in the matrix for a user-event pair can indicate the user executed that event and a value of "0" can indicate that user has not executed that event. In the matrix shown in FIG. 5B, user $U_1$ executed events $X_2$ and $X_m$, as indicated by the value one (1), and did not execute event $X_1$, as indicated by the value zero (0). $U_2$ executed event $X_1$ and did not execute events $X_2$ and $X_m$. $U_n$ executed events $X_1$ and $X_2$ and did not execute event $X_m$.

Figure 6:
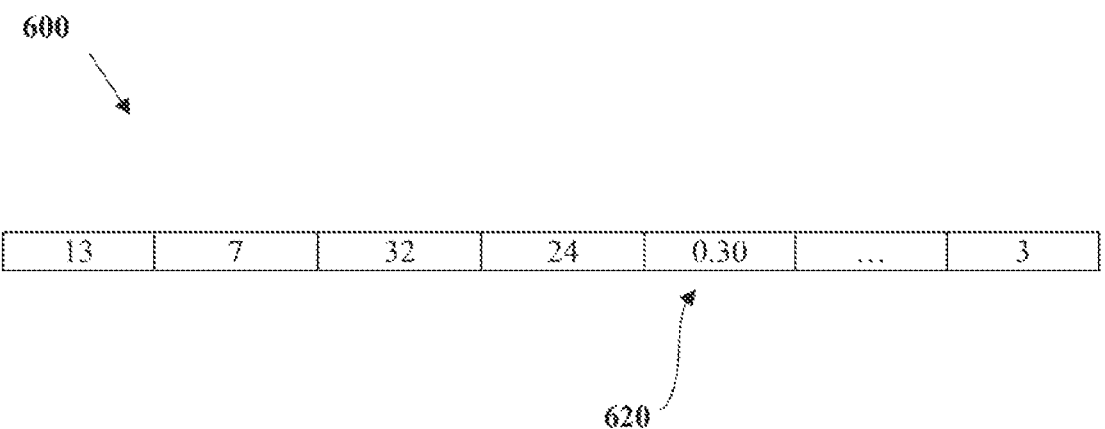
FIG. 6 illustrates a user-event recommendation feature vector according to an embodiment.

FIG. 6 shows an example of a recommendation feature vector 600. The processor generates the recommendation feature vector 600 based on the event execution records 410 and includes a recommendation factor 620 generated from the information from the user-event matrix. In a conventional recommendation system, a recommendation feature vector would include several parameters concerning the user-event pair which is used by the processor to recommend an event to user. In the present embodiment, an additional parameter 620 is included in the recommendation feature vector. That additional parameter 620 is the recommendation factor generated by the processor. The processor extracts the recommendation factor from the recommendation feature vector and uses it in a recommendation algorithm to adjust the recommendation to be made to the user.

Figure 7:
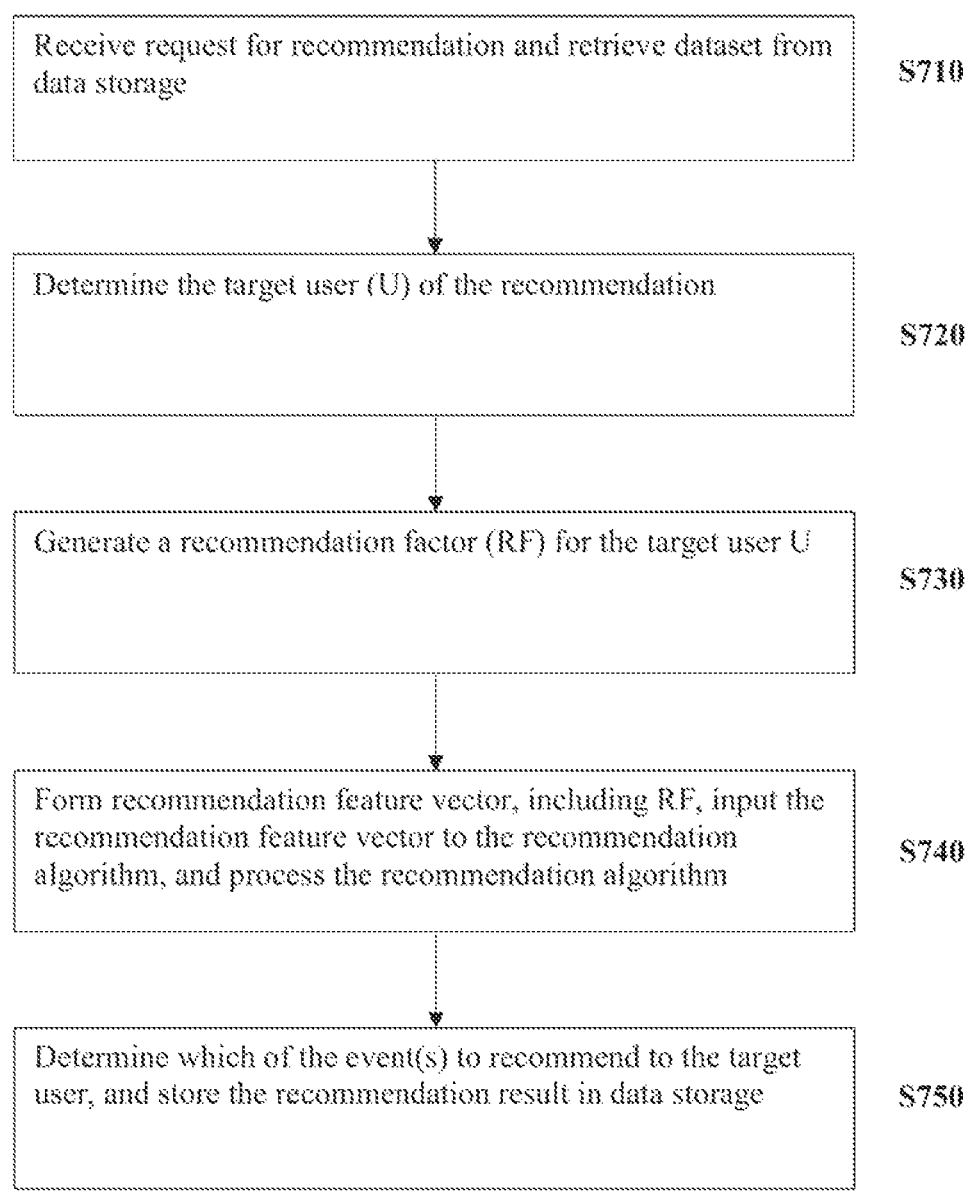
FIG. 7 is a flow chart illustrating an algorithm for using a recommendation factor.

An example embodiment of a method for generating a recommendation is illustrated in FIG. 7. In this embodiment, users execute events/items (e.g., event X) via the user terminals 420. Information about each of the executions is recorded and stored in a dataset in the data storage 430. The dataset includes execution records of multiple users (e.g., user 1 executes events X, Y, Z; user 2 executes events A, B, C, Z, etc.).

In step S710, a request for a recommendation is received and upon receiving the request, the processor 440 retrieves the dataset from the data storage 430.

In step S720, the processor 440 determines, from the request, a target user of the recommendation.

The processor 440 then, in step S730, processes the dataset to generate a recommendation factor according to Eq. (1). Specifically, the processor first determines an execution frequency according to Eq. 2 (i.e., a frequency the target user executed each of the events X, Y, Z) and an inverse user frequency according to Eq. 3 (i.e., a frequency indicating the common level of each of the events). Subsequently, the processor 440 computes a product of the execution frequency and the inverse user frequency to generate the recommendation factor.

The execution record of event X is stored in the data storage 430 and the processor 440 consumes that data and performs data processing. Feature extraction is performed based on the recommendation factor calculated according to Eq. 3. In step S740, the computed recommendation factor, along with other features, such as date-time information, form a recommendation feature vector for input to a recommendation algorithm (e.g., a logistic regression algorithm) processed by the processor 440.

In step S750, the possibility of the user executing event X is generated as the output of the recommendation algorithm. Subsequently, the processor 440 stores the recommendation result in data storage 430, which can be retrieved by the user or otherwise presented to the user.

A computer-readable medium, such as, but not limited to, a magnetic storage media, optical storage media, or solid-state storage media, can store program instructions that when executed by a computer processor, performs the steps illustrated in FIG. 7.

The following is an example of a use case for generating a recommendation using a recommendation factor, with the assumption of a in $\log_a$ has a value of "10".

$User_1$ executes event $X_1$ 10 times, event $X_2$ 10 times, and event $X_3$ 3 times.

Event $X_1$ has been executed by 20 users, event $X_2$ has been executed by 10 users, and event $X_3$ has been executed by 3 users. There are a total of 50 users.

Recommendation Factor for $User_1$ on $X_1 (RF_{11}) =$
$$\frac{10}{10+10+3} \times \log_{10} \frac{50}{20} = 0.17$$

Recommendation Factor for $User_1$ on $X_2 (RF_{12}) =$
$$\frac{10}{10+10+3} \times \log_{10} \frac{50}{10} = 0.30$$

Recommendation Factor for $User_1$ on $X_3 (RF_{13}) =$
$$\frac{3}{10+10+3} \times \log_{10} \frac{50}{3} = 0.16$$

Based on the computed recommendation factors, it can be determined that event $X_2$ has the highest weight (0.30) for $User_1$. Even though events $X_1$ and $X_2$ have the same execution frequency, $X_2$ is a more unique and more distinguishable event for User compared with event $X_1$.

The recommendation is customized for $User_1$ by including the computed recommendation factor in the recommendation feature vector 600 that is input to the recommendation algorithm. In this example, $RF_{12}$ is the recommendation factor determined to have the highest weight of 0.30 and it is included in the feature vector 600 as the recommendation factor feature 620.

In this example, event X could be a product, a workflow, a script, etc., which is suitable for recommendation to a user.

By generating a recommendation factor that adjusts the execution frequency based on the inverse user frequency, a more accurate recommendation of an event can be generated for a user that is not as influenced by the commonality of an event as with a conventional recommendation.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method, performed by at least one processor of a computing device, for recommending an event, the method comprising:

receiving a request for a recommendation of an event to a target user;

retrieving data from a storage device, wherein the data indicates a number of executions of each of a plurality of candidate events by each of a plurality of users including the target user;

determining, based on the retrieved data, a first metric of the target user for each of the candidate events, wherein the first metric of the target user is calculated based on a ratio of a number of executions of one of the candidate events by the target user to a total number of executions of the candidate events by the target user;

determining, based on the retrieved data, a second metric for each of the candidate events, wherein the second metric is calculated based on a ratio of a total number of the plurality of users to a number of users who have executed one of the candidate events;

generating and storing in the storage device a recommendation factor for each of the candidate events by modifying storing in the storage device the first metric for each of the candidate events based on the second metric for each of the candidate events, wherein the recommendation factor is modified according to:

Recommendation Factor$_{ij}$ =t$_{ij}$/$\Sigma^{m}_{k=1}$ $r_{ik} \times \log_a$ |U|/|{u$\epsilon$U: x$_j\epsilon$u}|, where t$_{ij}$/$\Sigma^{m}_{k=1}$ $r_{ik}$ represents an execution frequency$_{ij}$ and $\log_a$ |U|/|{u$\epsilon$U:x$_j\epsilon$u}| represents an inverse user frequency$_j$, where i is an integer from 1 to n and n=a number of users U, where j is an integer from 1 to m and m=a number of events X, and where $\log_a$ is a logarithm base a where a is a real number, wherein the first metric includes the execution frequency$_{ij}$, wherein the second metric includes the inverse user frequency$_j$;

calculating, and storing in the storage device based on a machine learning algorithm, a result using the recommendation factor for each of the candidate events as input;

selecting and storing in the storage device an event among the plurality of candidate events based on the result of the calculating; and presenting on a display the selected event.

2. The method according to claim 1, further comprising inputting the recommendation factor into a feature vector for input to a recommendation algorithm that determines a possibility of the user executing the event.

3. The method according to claim 2, wherein the recommendation algorithm is one or more of a logistic regression algorithm, a support vector machine (SVM) algorithm, and an Extreme Gradient Boosting (XGBoost) algorithm.

4. An apparatus for generating a recommendation, the apparatus comprising:

a data storage configured to store an event execution record comprising information concerning a plurality of events executed by a plurality of users; and at least one computer readable memory having recorded therein program instructions;

at least one processor configured to execute the program instructions, that when executed comprise:

receive a request for a recommendation of an event to a target user;

retrieve data from a storage device, wherein the data indicates a number of executions of each of a plurality of candidate events by each of a plurality of users including the target user;

determine, based on the retrieved data, a first metric of the target user for each of the candidate events, wherein the first metric of the target user is calculated based on a ratio of a number of executions of one of the candidate events by the target user to a total number of executions of the candidate events by the target user;

determine, based on the retrieved data, a second metric for each of the candidate events, wherein the second metric is calculated based on a ratio of a total number of the plurality of users to a number of users who have executed one of the candidate events;

generate and store in the storage device a recommendation factor for each of the candidate events by modifying and storing in the storage device the first metric for each of the candidate events based on the second metric for each of the candidate events, wherein the recommendation factor is modified according to:

Recommendation Factor$_{ij}$ =t$_{ij}$/$\Sigma^{m}_{k=1}$ $r_{ik} \times \log_a$ |U|/|{u$\epsilon$U: x$_j\epsilon$u}|, where t$_{ij}$/$\Sigma^{m}_{k=1}$ $r_{ik}$ represents an execution frequency$_{ij}$ and $\log_a$ |U|/|{u$\epsilon$U:x$_j\epsilon$u}| represents an inverse user frequency$_j$, where i is an integer from 1 to n and n=a number of users U, where i is an integer from 1 to m and m=a number of events X, and where $\log_a$ is a logarithm base a where a is a real number, wherein the first metric includes the execution frequency$_{ij}$, wherein the second metric includes the inverse user frequency$_j$;

calculate, and store in the storage device based on a machine learning algorithm, a result using the recommendation factor for each of the candidate events as input;

select and store in the storage device an event among the plurality of candidate events based on the result of the calculating; and present on a display the selected event.

5. The apparatus according to claim 4, wherein the recommendation factor is input into a feature vector for input to a recommendation algorithm that determines a possibility of the user executing the event.

6. The apparatus according to claim 5, wherein the recommendation algorithm is one or more of a logistic regression algorithm, a support vector machine (SVM) algorithm, and an Extreme Gradient Boosting (XGBoost) algorithm.

7. A non-transitory computer-readable medium comprising program instructions, that when executed by one or more processors, performs a method comprising:

receiving a request for a recommendation of an event to a target user;

retrieving data from a storage device, wherein the data indicates a number of executions of each of a plurality of candidate events by each of a plurality of users including the target user;

determining, based on the retrieved data, a first metric of the target user for each of the candidate events, wherein the first metric of the target user is calculated based on a ratio of a number of executions of one of the candidate events by the target user to a total number of executions of the candidate events by the target user;

determining, based on the retrieved data, a second metric for each of the candidate events, wherein the second metric is calculated based on a ratio of a total number of the plurality of users to a number of users who have executed one of the candidate events;

generating and storing in the storage device a recommendation factor for each of the candidate events by modifying and storing in the storage device the first metric for each of the candidate events based on the second metric for each of the candidate events, wherein the recommendation factor is modified according to:

Recommendation Factor$_{ij}$ =t$_{ij}$/$\Sigma^{m}_{k=1}$ $r_{ik} \times \log_a$ |U|/|{u$\epsilon$U: x$_j\epsilon$u}|, where t$_{ij}$/$\Sigma^{m}_{k=1}$ $r_{ik}$ represents an execution frequency$_{ij}$ and $\log_a$ |U|/|{u$\epsilon$U:x$_j\epsilon$u}| represents an inverse user frequency$_j$, where i is an integer from 1 to n and n=a number of users U, where i is an integer from 1 to m and m=a number of events X, and where $\log_a$ is a logarithm base a where a is a real number, wherein the first metric includes the execution frequency$_{ij}$, wherein the second metric includes the inverse user frequency$_j$;

calculating, and storing in the storage device based on a machine learning algorithm, a result using the recommendation factor for each of the candidate events as input;

selecting and storing in the storage device an event among the plurality of candidate events based on the result of the calculating; and presenting on a display the selected event.

8. The non-transitory computer-readable medium according to claim 7, wherein the method further comprises inputting the recommendation factor into a feature vector for input to a recommendation algorithm that determines a possibility of the user executing the event.

9. The non-transitory computer-readable medium according to claim 8, wherein the recommendation algorithm is one or more of a logistic regression algorithm, a support vector machine (SVM) algorithm, and an Extreme Gradient Boosting (XGBoost) algorithm.

* * * * *